2 Sheets—Sheet 1.

J. A. KRAKE.
Grain-Separator.

No. 223,233. Patented Jan. 6, 1880.

Attest.
John C. Burns
Jacob Spahn

Inventor.
John A. Krake
R. L. Osgood
Atty.

N. PETERS, PHOTO-LITHOGRAPHER, WASHINGTON, D. C.

2 Sheets—Sheet 2.
J. A. KRAKE.
Grain-Separator.
No. 223,233. Patented Jan. 6, 1880.
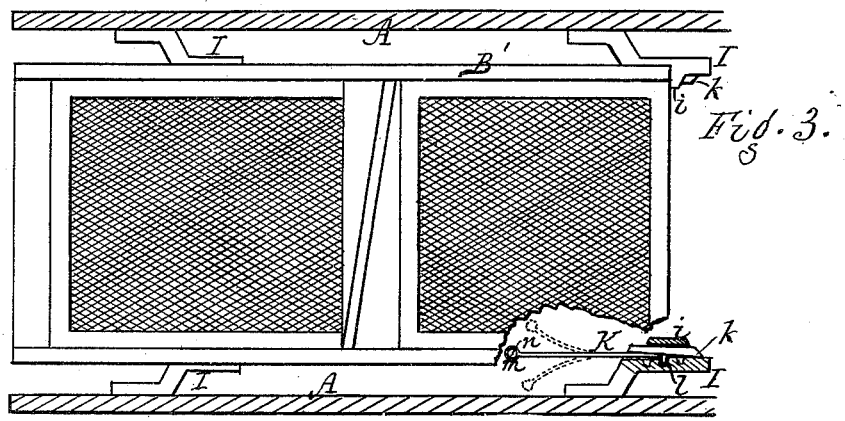
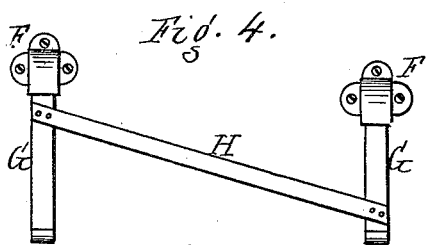
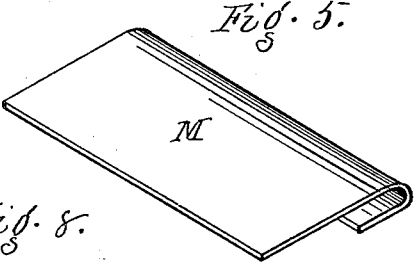
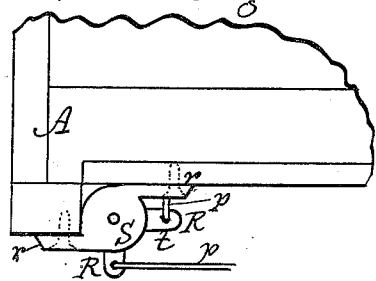
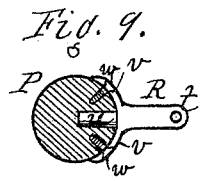
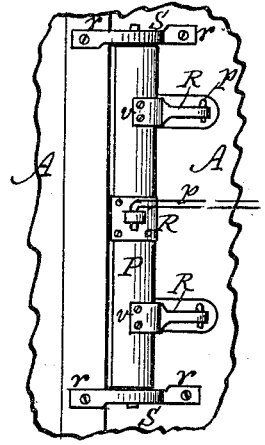
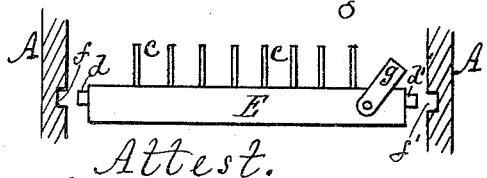
Attest.
John C. Burns
Jacob Fisher
Inventor.
John A. Krake
R. F. Osgood,
Atty.
N. PETERS, PHOTO-LITHOGRAPHER, WASHINGTON, D. C.

UNITED STATES PATENT OFFICE.

JOHN A. KRAKE, OF BUFFALO, NEW YORK.

GRAIN-SEPARATOR.

SPECIFICATION forming part of Letters Patent No. 223,233, dated January 6, 1880.

Application filed May 14, 1879.

*To all whom it may concern:*

Be it known that I, JOHN A. KRAKE, of the city of Buffalo, county of Erie, and State of New York, have invented a certain new and useful Improvement in Fanning-Mills and other Grain-Separators; and I do hereby declare that the following is a full, clear, and exact description of the same, reference being had to the accompanying drawings, in which—

Figure 1:
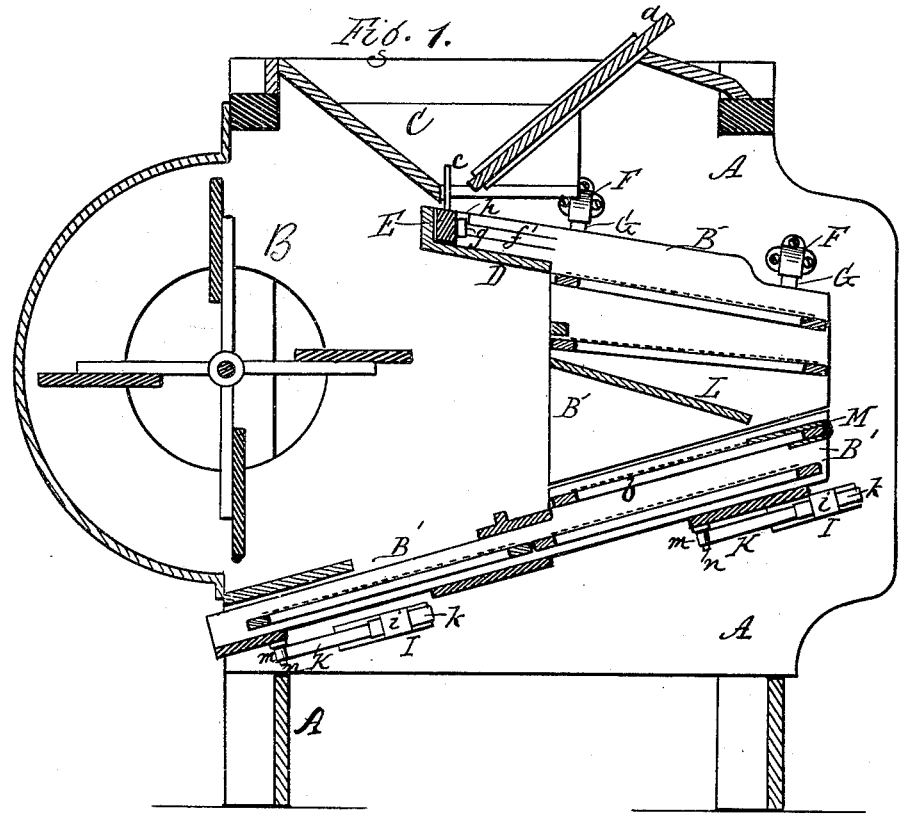
Figure 2:
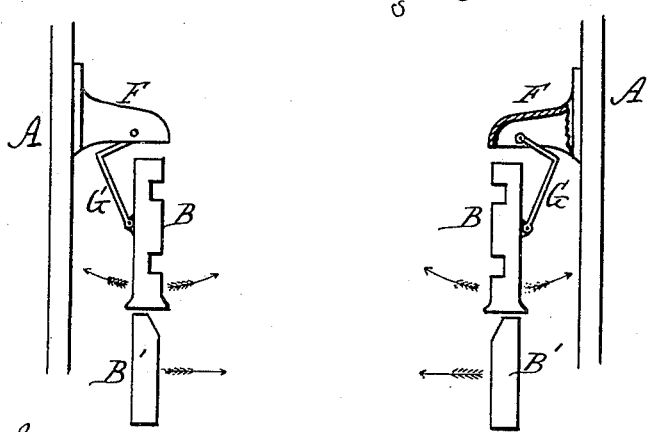

Figure 1 is a longitudinal vertical section of the machine. Fig. 2 is a diagram, showing the arrangement of the two shoes. Fig. 3 is a plan of the lower shoe. Figs. 4, 5, 6, 7, 8, 9, and 10 are detail views.

My invention relates to certain new and useful improvements in fanning-mills and other grain-separators; and it consists in the construction and arrangement of parts hereinafter more fully described.

A represents the frame and casing of the mill, in which is mounted a fan, as usual. B B' are the shoes, of which two are used, being located one directly over the other, but each having an independent shake motion. C is the hopper by which the grain is fed into the mill. It is of the angular form shown in Fig. 1, and has a slide-board, $a$, by which the flow of the grain is graduated or regulated. The edges of this board are made V-shaped in cross-section, and fit in corresponding V-shaped grooves at the sides of the hopper, as shown in the detail view, Fig. 6. The edges of the ways in which the grooves are formed project a little above the level of the slide, which has the effect of throwing off fine seeds and other substances, which would otherwise pass down into the grooves and obstruct the action of the slide. The indirect joint thus produced effectually prevents the passage of extraneous matters into the joint, and is much more effective than the straight joint ordinarily used. This device also has the effect of preventing the slide from warping, bending, and splitting.

D is the chute of the upper shoe, which rests under the hopper. E is an agitator attached to this chute and directly under the discharge-slot of the hopper. This agitator consists of a bar which extends across the chute, and a series of upwardly-projecting teeth, $c\ c$, which pass up through the discharge-slot of the hopper. As the shoe receives a lateral vibration this agitator receives a like motion, and stirs up and feeds down the material in the hopper, preventing clogging, and also producing a regular and uniform discharge of the grain downward and an equal spreading of the same over the chute preparatory to passing over the screens. It is used more especially in cleaning grain. In winnowing, where there is much chaff and light stuff in the hopper, it is removed.

On one end of the agitator is a projecting tenon, $d$, which fits in a corresponding socket, $f$, and on the other end is a corresponding tenon, $d'$, which slides forward and back in a vanishing groove, $f'$, in the side of the shoe. $g$ is a button pivoted to turn at the end of the agitator last described, and $h$ is a cross groove or slot in the side of the shoe, into which this button strikes when turned down.

The agitator is applied as follows: The tenon $d$ is inserted in socket $f$, and the opposite tenon, $d'$, is then pressed backward through groove $f'$ to the rear end of the same, after which the button $g$ is dropped into the cross-slot $h$, which securely locks the agitator in place. It is removed with the same facility.

By the use of this agitator the grain can always be fed down properly and without clogging, and by making it removable, as described, the mill can be used without it.

F F are projecting bracket-bearings on the inner sides of the casing, and G G are hangers pivoted thereto and to the sides of the upper shoe, by which the latter is sustained. The pivots of the bracket-bearings are near the outer ends, and the bearings are hollow and open on their under sides, as shown. The hangers are of elbow form, as indicated, the elbows standing backward toward the sides of the mill. The length of the upper end of the elbow is such as to strike into the socket of the bracket-bearing, and the width is also such as to shut into said bearing. By this means, as the hangers are vibrated laterally their upper ends strike into the bearings, and the sides of the latter form guides to the hangers, to give a true motion forward and back and to prevent any twisting action. The two hangers next the fan, or at the rear end of the shoe, are longer than the two outer ones at the discharge end. H is a brace on each side, connecting the two hangers on that side. It stands in an angular position, connecting the bottom of one hanger with the top of the other, in order to produce the best effect of a brace, and is riveted or otherwise firmly attached in place. This brace is necessarily made of some spring material which will yield by torsion, in order to compensate for the unequal vibration of the two hangers past the dead-center. The action of these hangers is as follows: Owing to the shorter length of the outer hangers, or those at the discharge end, the arc of vibration at that point is shorter than of the long hangers. Consequently there will be a greater vertical rise and fall at the outer than at the inner end of the shoe. This action produces a toss at the outer end of the shoe, which agitates the grain at that point where it is most liable to lodge and clog, thereby facilitating the discharge and keeping the screens always clear. The spring-braces H H allow this unequal vibration of the hangers to take place, as before described, and, in addition to their function as braces, they serve as springs proper, to react upon the swinging movement of the shoe and bring it back to its normal position, which they do by torsion.

I I are bearings secured to the sides of the mill beneath the lower shoe, and K K are springs attached thereto at one end, and at the other end to the bottom of the lower shoe. The connection is made as follows: The outer ends of the bearings have sockets $i$ $i$, through which the ends of the springs pass, and are secured in place by keys $k$ $k$, which slide into the sockets by the sides of the springs. The ends of the springs are bent at right angles, forming short lugs $l$ $l$, which fit in corresponding cavities or depressions in the sockets, and when secured by the keys they are held fast. The opposite ends of the springs have eyes $m$ $m$, through which pivots or screws $n$ $n$ pass, securing the springs to the bottom of the shoe. Ordinarily four of the springs are employed, one at each corner; but more may be employed, if desired, and in very wide screens more are desirable. In such cases the bearing of the middle spring rests on some support between the two sides of the mill.

By the means above described the lower shoe, in addition to the lateral vibration it receives, has a longitudinal jarring motion, produced by the swinging of the springs in the arc of a circle on each side of the dead-center. This jarring motion prevents clogging of the grain on the screens and gives it a longitudinal throw, which works it over the screens and over the discharge-board at the end. In adjusting the springs to place the springs may be taken up more or less in the sockets of the bearings, thus adapting the motions of the shoe to the kind of work to be done. This is a convenient and effective way of hanging the lower shoe.

L is a discharge-board located beneath the upper screens and receiving the grain therefrom. The main blast passes under said discharge-board, and is compressed or narrowed between said board and the reversely-inclined screen $b$ below it.

M is an adjustable sliding plate, which fits over the end of the screen at either end, but is particularly adapted to the screen $b$ below the discharge-board. The grain from discharge-board L falls upon the lower edge of sliding plate M. Here the heavy grain works down over the screen; but the refuse and lighter grains are thrown over the sliding plate by the action of the compressed blast. By moving said sliding plate up or down the same is adapted to different degrees of the blast or to different kinds of grain which are to be acted on. The adjustment of the plate outward and inward is essential to make the same effective in operation, as the grain cannot otherwise be properly separated from the refuse, which falls on the plate.

P is the rocker-shaft at one side of the machine, by which the shoes are laterally vibrated through the medium of crank-arms R R and connecting-rods $p$ $p$, as usual. The ends of the rocker rest in cast bearings S S, each of which has a central hole to receive the journal of the rocker and two lugs, $r$ $r$, standing tangentially or eccentrically to the bearing, and resting, respectively, against the sides of the casing and the post of the frame, to which they are screwed, as shown in Fig. 7. By this means a firm support for the rocker is secured, and the bearing itself is strongly fixed in place both to the side of the mill and the post, and the frame of the machine is also strengthened.

The crank-arms R each consist of the crank-arm proper, $t$, an inwardly-projecting pin, $u$, which enters a hole bored in the rocker-shaft, and a curved flange, $v$, which partially encircles the rocker-shaft, and is fastened thereto, on opposite sides of the pin, by screws $w$ $w$, as shown in Fig. 9. By this means the crank-arm is more securely fastened to the rocker than by the ordinary plates, the pin $u$ having a bearing in the shaft and the flange $v$ embracing it, and the shaft itself is greatly strengthened and is prevented from splitting.

Having thus described my invention, what I claim as new is—

1. In a grain-separator, the agitator E, constructed with the two end tenons, $d$ $d'$, and provided with the pivoted button $g$, in combination with the socket $f$ on one side and the groove $f'$ and cross-slot $h$ on the other side of the shoe, whereby said agitator is made removable, as herein shown and described.

2. In a grain-separator, the combination, with the upper shoe, B, of the bracket-bearings F F and the hangers G G, the bearings being made hollow and open on their under sides, and the hangers being made of elbow form and arranged to strike into and be guided by the hollow bearings, as herein shown and described.

3. In a grain-separator, the combination, with the upper shoe, B, of the hangers G G, of elbow form and unequal length, arranged above the shoe and sustaining the same, the upper and lower pivots being in a vertical line, the whole so arranged, as described, that the shoe maintains a level position at all points of the vibration, and its outer end receives a greater vertical throw than the inner end, as herein specified.

4. In a grain-separator, the combination, with the hangers G G, made of elbow form and of unequal length, of the diagonal brace H, connecting the hangers, said brace being made of spring metal, so as to spring by torsion and compensate for the unequal vibration of the two hangers, as herein described.

5. In a grain-separator, the shoe B', mounted at either end upon springs K K', arranged to vibrate laterally in the line of an arc and in a plane parallel to that of the shoe, as herein shown and described.

6. In a grain-separator, the spring K, provided with the bent end $l$, in combination with the bearing I, provided with a socket to receive the spring and notches to receive its bent end, and with a key for securing the spring in place, as described.

7. In a grain-separator, the combination of the adjustable inclined discharge-board L, standing at a reverse angle to the screen $b$ below it, for compressing the blast, and the adjustable sliding plate M on the outer end of said screen $b$, so arranged, as herein described, that it can be moved toward or from the discharge-board to receive the contents therefrom and produce proper separation of the light from the heavy grain under varying intensities of the blast, as herein shown and described.

8. In a grain-separator, the crank-arm R, constructed with the arm $t$, the pin $u$, and the curved flange $v$, as and for the purpose specified.

In witness whereof I have hereunto signed my name in the presence of two subscribing witnesses.

JOHN A. KRAKE.

Witnesses:
R. F. OSGOOD,
R. E. WHITE.